(12) United States Patent
Forgette et al.

(10) Patent No.: US 9,128,884 B2
(45) Date of Patent: Sep. 8, 2015

(54) VIRTUAL MACHINE FAULT TOLERANCE

(71) Applicant: NetApp Inc., Sunnyvale, CA (US)

(72) Inventors: Eric Paul Forgette, Mechanicsville, VA (US); Deepak Kenchammana-Hosekote, Mountain View, CA (US); Shravan Gaonkar, Sunnyvale, CA (US); Arthur Franklin Lent, Newton, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/063,689

(22) Filed: Oct. 25, 2013

(65) Prior Publication Data

US 2014/0053022 A1 Feb. 20, 2014

Related U.S. Application Data

(63) Continuation of application No. 13/110,582, filed on May 18, 2011, now Pat. No. 8,621,274.

(51) Int. Cl.
*G06F 11/00* (2006.01)
*G06F 11/14* (2006.01)
*G06F 11/20* (2006.01)

(52) U.S. Cl.
CPC .......... *G06F 11/1469* (2013.01); *G06F 11/203* (2013.01); *G06F 11/2035* (2013.01); *G06F 11/2048* (2013.01); *G06F 2201/815* (2013.01); *G06F 2201/84* (2013.01)

(58) Field of Classification Search
USPC ......................................................... 714/4.11
See application file for complete search history.

(56) References Cited

U.S. PATENT DOCUMENTS

| | | | |
|---|---|---|---|
| 6,195,760 B1 * | 2/2001 | Chung et al. | 714/4.1 |
| 7,840,839 B2 * | 11/2010 | Scales et al. | 714/13 |
| 8,201,169 B2 * | 6/2012 | Venkitachalam et al. | 718/1 |
| 8,499,297 B2 * | 7/2013 | Chen et al. | 718/1 |
| 8,621,274 B1 * | 12/2013 | Forgette et al. | 714/10 |
| 2010/0107158 A1 * | 4/2010 | Chen et al. | 718/1 |
| 2010/0169592 A1 * | 7/2010 | Atluri et al. | 711/162 |
| 2010/0318991 A1 * | 12/2010 | Venkitachalam et al. | 718/1 |
| 2011/0010515 A1 * | 1/2011 | Ranade | 711/162 |
| 2011/0113206 A1 * | 5/2011 | Heim | 711/162 |
| 2011/0289345 A1 * | 11/2011 | Agesen et al. | 714/4.11 |
| 2012/0204061 A1 * | 8/2012 | Agesen et al. | 714/15 |
| 2012/0284714 A1 * | 11/2012 | Venkitachalam et al. | 718/1 |
| 2013/0067277 A1 * | 3/2013 | Mummidi | 714/19 |
| 2013/0097120 A1 * | 4/2013 | Mummidi | 707/649 |
| 2013/0290782 A1 * | 10/2013 | Chen et al. | 714/19 |

* cited by examiner

*Primary Examiner* — Kamini Patel
(74) *Attorney, Agent, or Firm* — Cooper Legal Group, LLC

(57) ABSTRACT

One or more techniques and/or systems are provided for hosting a virtual machine from a snapshot. In particular, a snapshot of a virtual machine hosted on a primary computing device may be created. The virtual machine may be hosted on a secondary computing device using the snapshot, for example, when a failure of the virtual machine on the primary computing device occurs. If a virtual machine type (format) of the snapshot is not supported by the secondary computing device, then the virtual machine within the snapshot may be converted to a virtual machine type supported by the secondary computing device. In this way, the virtual machine may be operable and/or accessible on the secondary computing device despite the failure. Hosting the virtual machine on the secondary computing device provides, among other things, fault tolerance for the virtual machine and/or applications comprised therein.

20 Claims, 8 Drawing Sheets

VIRTUAL MACHINE FAULT TOLERANCE

RELATED APPLICATIONS

This application is a continuation of U.S. application Ser. No. 13/110,582, filed on May 18, 2011, entitled "VIRTUAL MACHINE FAULT TOLERANCE", at least some of which may be incorporated herein.

FIELD

The instant disclosure pertains to providing virtual machine fault tolerance from a snapshot.

BACKGROUND

Virtualization allows, among other things, many computing environments, such as general desktop environments, database servers, etc., to be implemented through software as virtual machines within host computing devices. A virtual machine may comprise its own operating system, applications, data files, and/or configuration, etc. As such, the virtual machine may function as a self-contained computing environment. The virtual machine may be an abstraction of the underlying hardware resources (e.g., share physical resources of the host device with one or more other virtual machines hosted by the host device). That is, the virtual machine may be a software implementation of a physical computing machine that has normal operational functionality of the physical computing machine. For example, a host computing device may comprise virtual machine host software (e.g., a hypervisor) configured to host and manage virtual machines (e.g., a virtual machine may be hosted as an instance of a virtual machine instantiated on a host computing device). The virtual machine host software may allow a user to perform a wide variety of tasks, such as virtual machine creation, deletion, configuration, initialization, backup, etc. with respect to the hosted virtual machines. The virtual machine host software may allow the user to interface to and interact with a hosted virtual machine. For example, the user may interact with the operating system and applications of the hosted virtual machine through the virtual machine host software. It may be appreciated that a virtual machine may be hosted in a running state where the virtual machine may be operating and/or accessible, or in an off state where the virtual machine may be shutdown and/or inaccessible. It may be appreciated that in one example, hosting a virtual machine may correspond to at least one of: instantiating a running instance of a virtual machine, instantiating an instance of a virtual machine in an off state, executing a virtual machine, booting up a virtual machine into an operating state, and/or a wide variety of other actions and/or states that may be associated with a virtual machine.

Unfortunately, many virtual machines and/or applications comprised therein may lack adequate fault tolerance. For example, a virtual machine may comprise a small lightweight legacy application that nevertheless provides important functionality (e.g., a business application configured to provide a corporation with access to business data). Such legacy applications may have been developed without fault tolerance in mind. For example, to reduce size and/or complexity, a legacy application may have been written with little to no error reporting and/or handling functionality. Thus, if the legacy application and/or virtual machine fail, then limited error feedback and/or recovery may be available.

SUMMARY

Virtual machines may be hosted or instantiated from snapshots as provided herein (e.g., to provide for fault tolerance). It may be appreciated that a virtual machine may be hosted by a computing device as one or more instances of the virtual machine (e.g., a virtual machine may be hosted as a first instance of the virtual machine instantiated on a primary computing device, a second instance of the virtual machine instantiated on a secondary computing device, and/or other instances of the virtual machine instantiated on various computing devices). In particular, a virtual machine may be hosted or developed on a secondary computing device from a snapshot of the virtual machine (e.g., a backup of the virtual machine or a picture of the virtual machine taken at a particular point in time (e.g., to capture the state of the virtual machine at that time)), where the snapshot was created while the virtual machine was hosted or instantiated in a running state or an off state on a primary computing device. In one example, a primary computing device may be configured to host a virtual machine (e.g., an instantiation of an instance of the virtual machine). For example, the primary computing device may routinely provide users with access to interact with the virtual machine. One or more snapshots (e.g., one or more backup images of the virtual machine's data and configuration at a particular point in time) may be created while the virtual machine is/was hosted on the primary computing device (e.g., a snapshot of the virtual machine while in a running state, a snapshot of the virtual machine while in an off state, etc.). The one or more snapshots of the virtual machine may be provided to a secondary computing device. The secondary computing device may be configured to host the virtual machine based upon a snapshot in the event the virtual machine on the primary computing device fails. In this way, the virtual machine may remain available (e.g., to users, other virtual machines, and/or computing devices) by virtue of its existence on the secondary computing device even though the virtual machine may be inaccessible on the primary computing device due to the failure.

In one example, a snapshot of the virtual machine may be received at the secondary computing device. The secondary computing device may be configured to detect failure of the virtual machine hosted on the primary computing device (e.g., from issues with hardware and/or software of the virtual machine and/or host computing device). In one example, communication with the virtual machine and/or the primary computing device may be lost (e.g., via loss of heartbeat signal, round-robin detection, notification from a hypervisor configured to manage virtual machines, etc.). In another example, a notification from the primary computing device that the virtual machine failed may be received. Upon detecting such failure, the virtual machine may be hosted on the secondary computing device based upon the snapshot. To host the virtual machine, one or more determinations may be made as to whether a primary virtual machine type of the snapshot (e.g., a format of the virtual machine and/or snapshot from the primary computing device) is supported by the secondary computing device, whether the snapshot was created while the virtual machine was in a running state or an off state, and/or whether the virtual machine is to be hosted in a running state or an off state on the secondary computing device. In this way, the virtual machine may be hosted on the secondary computing device to provide fault tolerance for the virtual machine and/or applications hosted therein while the primary computing device is re-initialized.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
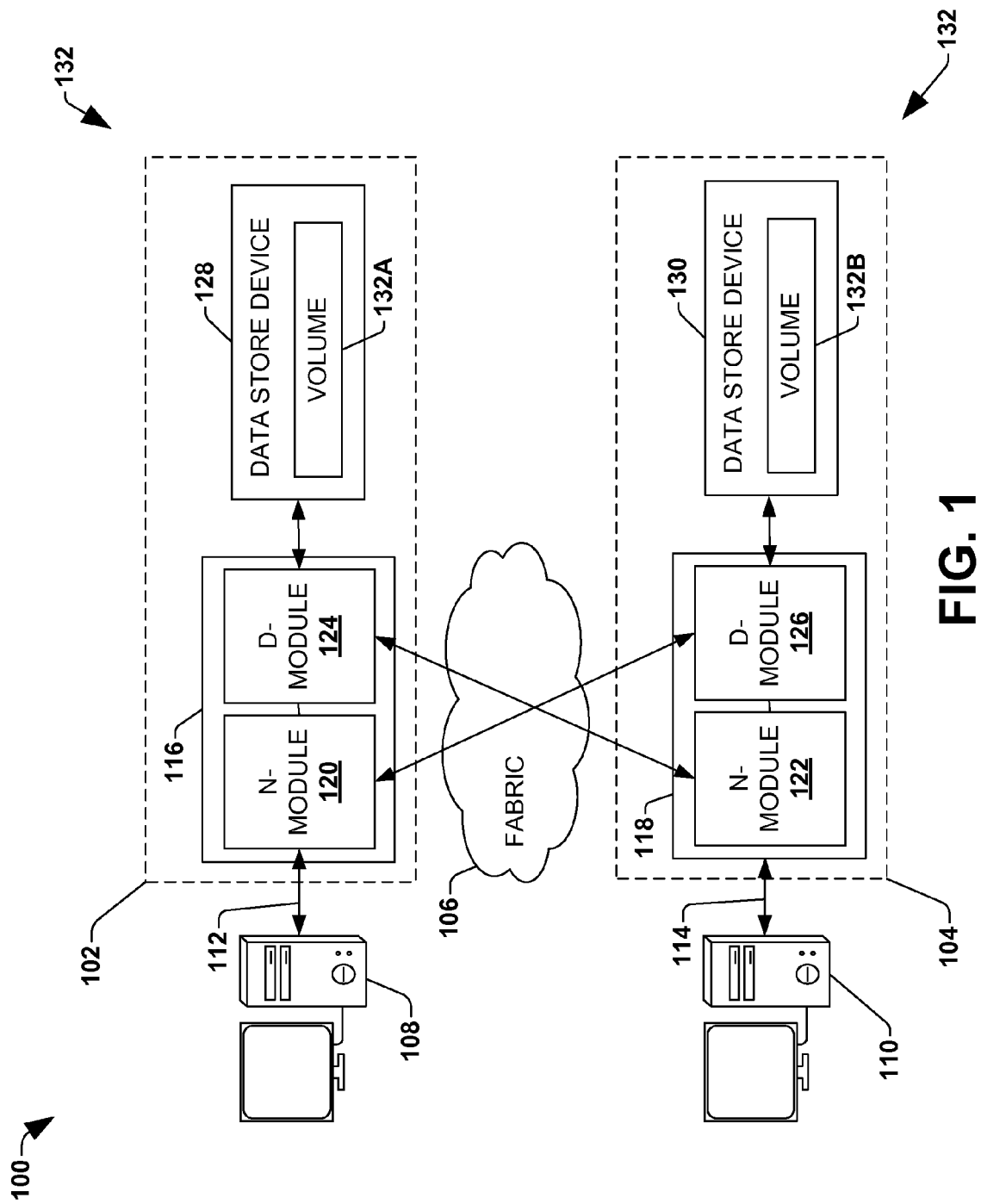
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Host computing devices may be configured to host and/or manage virtual machines. For example, a primary computing device may comprise virtual machine host software configured to facilitate hosting a virtual machine. The virtual machine host software may provide users with access to one or more aspects of the virtual machine, such as an operating system and/or application(s) of the virtual machine. To facilitate backup and recovery of the virtual machine, snapshots of the virtual machine may be created while the virtual machine is hosted (e.g., instantiated) on the primary computing device. Unfortunately, the virtual machine and/or applications of the virtual machine may comprise inadequate error reporting and handling functionality. For example, when the virtual machine fails (e.g., the primary computing device fails, the virtual machine operating system fails, an application hosted by the virtual machine fails, etc), the virtual machine may be inaccessible until the virtual machine can be brought back to a running state on the primary computing device.

Accordingly, as provided herein, a virtual machine may be hosted on a secondary computing device from a snapshot to provide fault tolerance for the virtual machine and/or applications of the virtual machine. In particular, snapshots of a virtual machine may be created while the virtual machine is hosted on a primary computing device in a running state or an off state. The secondary computing device may receive such snapshots of the virtual machine. Upon detecting failure of the virtual machine hosted on the primary computing device, the virtual machine may be hosted on the secondary computing device based upon a snapshot (e.g., a new instance of the virtual machine may be instantiated in a running state or an off state). In this way, the secondary computing device may host the virtual machine so that the virtual machine may be operable and accessible even though the virtual machine failed on the primary computing device. A second snapshot of the virtual machine hosted on the secondary computing device may be created. Once the primary computing device is re-initialized (e.g., capable of hosting the virtual machine), the second snapshot may be provided to the primary computing device. The primary computing device may host the virtual machine (e.g., instantiate a new instance of the virtual machine) on the primary computing device from the second snapshot. In this way, the virtual machine may be operable and accessible on the secondary computing device until the virtual machine can once again be hosted on the primary computing device.

Figure 2:
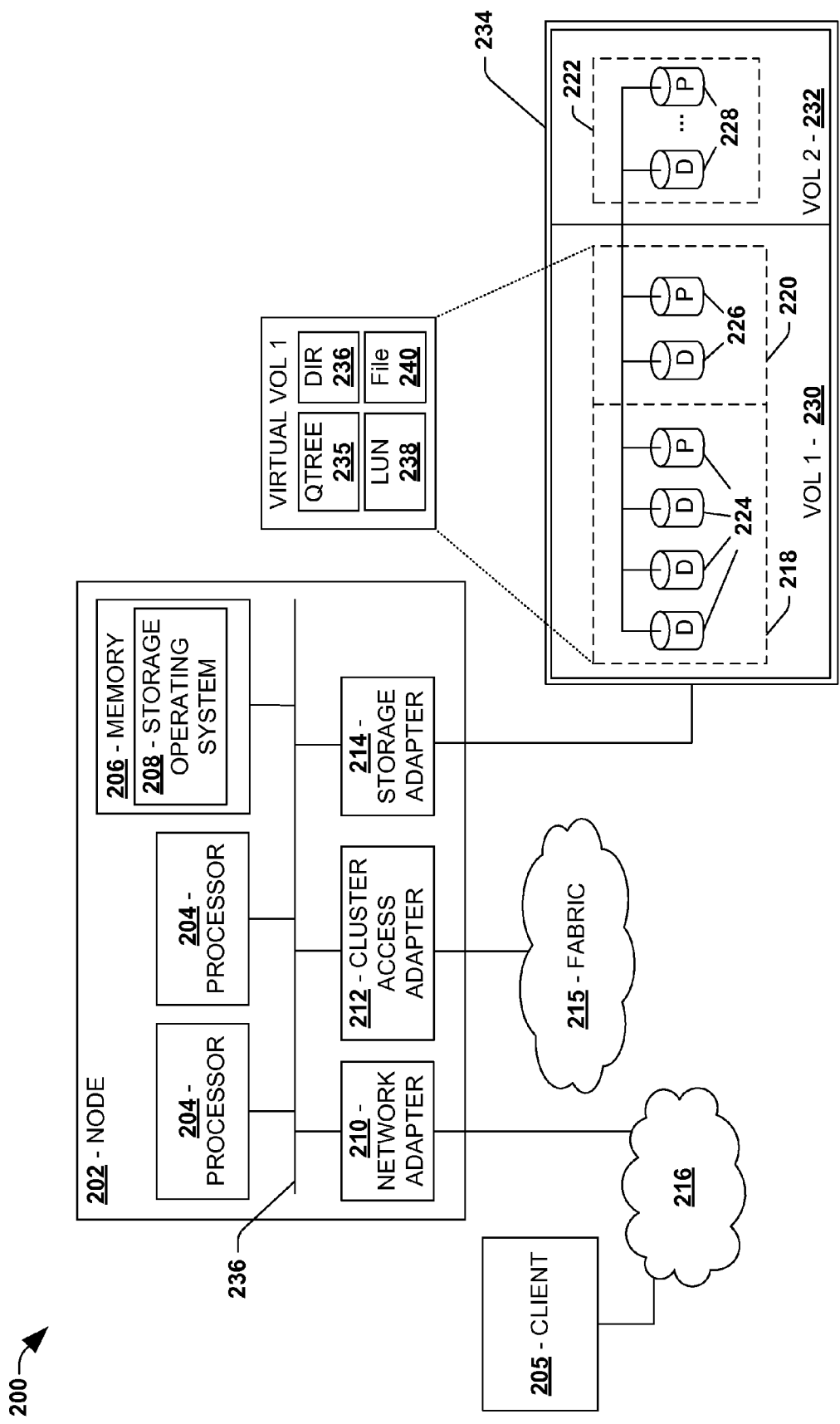
FIG. 2 is a component block diagram illustrating an example data storage system in accordance with one or more of the provisions set forth herein.

To provide a context for an embodiment for hosting, instantiating, developing, etc. a virtual machine from a snapshot, FIG. 1 illustrates a clustered network environment 100, and FIG. 2 illustrates an embodiment of a data storage system that may be implemented to store and manage data in this clustered network environment, including cluster backup data and/or node backup data. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that one or more virtual machines may be hosted within environment 100. In one example, data storage systems 102, 104 may host virtual machines, and may respectively serve as primary and secondary virtual machine host computing devices, for example. In another example, clients 108, 110 may host virtual machines, and may respectively serve as primary and secondary virtual machine host computing devices, for example. It may be appreciated that nearly any computing device may host virtual machines. It may be advantageous to provide disaster recovery for one or more virtual machines hosted within environment 100. Accordingly, a snapshot of a virtual machine hosted on a primary computing device (e.g., 108) may be used to host the virtual machine on a secondary computing device (e.g., 110) upon detecting failure of the virtual machine hosted on the primary computing device.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that one or more virtual machines may be hosted within data storage system 200. In one example, node 202 may host virtual machines initialized on virtual hard drive data objects stored across at least some of data storage devices 234. In another example, client 205 may host virtual machines. It may be appreciated that essentially any computing device may host virtual machines. It may be advantageous to provide disaster recovery for the virtual machines hosted within data storage system 200. Accordingly, a snapshot of a virtual machine hosted on a primary computing device (e.g., 205) may be used to host the virtual machine on a secondary computing device (e.g., 202) upon detecting failure of the virtual machine hosted on the primary computing device.

Figure 3:
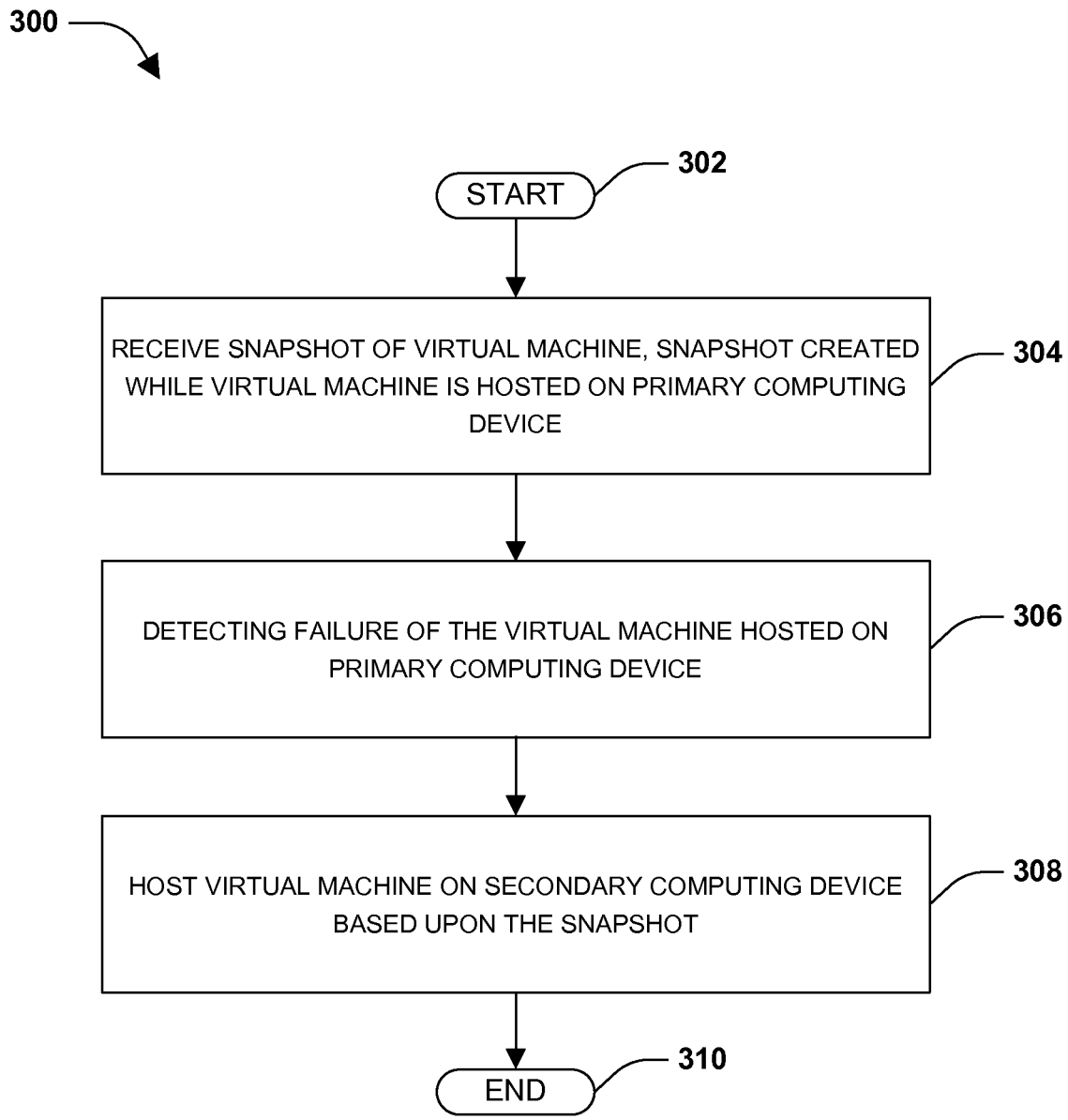
FIG. 3 is a flow chart illustrating an exemplary method of hosting a virtual machine from a snapshot.

One embodiment of hosting a virtual machine from a snapshot is illustrated by an exemplary method 300 in FIG. 3. At 302, the method starts. At 304, a snapshot of a virtual machine may be received. The snapshot may correspond to a backup of the virtual machine. In particular, the snapshot may comprise a backup of the virtual machine (e.g., a backup image of the virtual machines' data and/or configuration at a particular point in time) while the virtual machine was hosted on a primary computing device. For example, the primary computing device may comprise virtual machine host software configured to host the virtual machine in a running state or an off state. The virtual machine host software may provide users with access to interact with the virtual machine and/or provide management functionality, such as snapshot creation, for the virtual machine. The virtual machine may be hosted on the primary computing device in a running state or an off state. In a running state, an operating system and/or applications of the virtual machine may be accessible and/or executing. In an off state, the operating system and/or applications of the virtual machine may be inactive and/or not executing.

At 306, failure of the virtual machine on the primary computing device may be detected. In one example, a notification that the primary computing device failed may be received. In another example, a notification that the virtual machine failed may be received (e.g., a hypervisor may provide notification that the virtual machine failed). In another example, communication with the virtual machine may be lost, (e.g., via loss of heartbeat signal, round-robin detection, etc.) which may indicate a failure of the hosted virtual machine. It may be appreciated that the failure may indicate that the virtual machine may be inaccessible to users, other virtual machines, and/or computing devices. Thus, it may be advantageous to host the virtual machine on a secondary computing device to provide access to the virtual machine which otherwise may be inaccessible on the primary computing device.

At 308, the virtual machine may be hosted on the secondary computing device based upon the snapshot. In one example, a clone of the snapshot may be made. The virtual machine may be hosted on the secondary computing device based upon the clone.

To host the virtual machine, one or more determinations may be made as to whether a primary virtual machine type of the snapshot (e.g., a format of the virtual machine and/or snapshot from the primary computing device) is supported by the secondary computing device, whether the snapshot was created while the virtual machine was in a running state or an off state, and/or whether the virtual machine is to be hosted in a running state or an off state on the secondary computing device. It may be appreciated that a virtual machine type may be associated with a format of the virtual machine and/or snapshot. In one example, the virtual machine type may be based upon virtual machine host software that hosted the virtual machine and/or created the snapshot. For example, virtual machine host software of the primary computing device may associate the virtual machine and/or snapshot with a open virtualization format (OVF), a virtual machine disk format (VMDF), a virtual hard disk format (VHD), and/or other virtual machine format.

It may be appreciated that in one example, virtual machine host software of the secondary computing device may indicate which virtual machine types the virtual machine host software supports. Thus, virtual machine host software of the secondary computing device may be queried to determine which virtual machine types are supported by the secondary computing device. It may be appreciated that a variety of techniques may be employed to convert a virtual machine within a snapshot between various virtual machine types/formats. For example, the virtual machine may be converted while shutdown in an off state by a virtual machine formatting tool.

It may be appreciated that in one example, a state of the snapshot may be determined by reading a snapshot state file that stores a state of the snapshot (e.g., a .vmsn file).

It may be appreciated that a virtual machine may be hosted in a running state (or not (e.g., an off state)) by instantiating or developing an instance of the virtual machine from a snapshot (e.g., getting the virtual machine up and running based upon the snapshot). That is, virtual machine host software may be configured to host a virtual machine in a particular state (e.g., a running state, an off state, etc.) by instantiating an instance the virtual machine (e.g., boot up an operating system and/or application binaries of the virtual machine so that the virtual machine may be operable and/or accessible in a running state).

In a first example of hosting the virtual machine, it may be determined that the primary virtual machine type is supported by the secondary computing device, the snapshot was created while the virtual machine was in a running state on the primary computing device, and the virtual machine is to be hosted on the secondary computing device in a running state. In this way, the virtual machine may be hosted on the secondary computing device in a running state directly (e.g., without additional conversion) from the snapshot because the snapshot reflects the virtual machine in a running state, and the format of the virtual machine is supported by the secondary computing device without additional conversion.

In a second example of hosting the virtual machine, it may be determined that the primary virtual machine type is supported, the snapshot was created while the virtual machine was in a running state on the primary computing device, and the virtual machine is to be hosted on the secondary computing device in an off state. In this way, the virtual machine may be hosted on the secondary computing device in an off state. For example, the snapshot may be directly applied (e.g., without additional conversion) to host the virtual machine on the secondary computing device because the format of the virtual machine is supported without additional conversion. The hosted virtual machine may be shut down into an off state because the snapshot reflects the virtual machine in a running state. That is, because the snapshot reflects the virtual machine in a running state, but the virtual machine is to be hosted on the secondary computing device in an off state, the virtual machine may have to be deactivated upon being hosted (e.g., instantiated) on the secondary computing device so that it is not executing. In one example, the virtual machine may be hosted on the secondary computing device after consolidating the snapshot (e.g., multiple snapshots may be aggregated and the virtual machine instantiated based upon this aggregation (e.g., aggregate snapshot), such as to propagate non-conflicting features in the different snapshots to promote a more feature-rich, robust, etc. resulting virtual machine, for example).

In a third example of hosting the virtual machine, it may be determined that the primary virtual machine type is supported, the snapshot was created while the virtual machine was in an off state on the primary computing device, and the virtual machine is to be hosted on the secondary computing device in an off state. In this way, the virtual machine may be hosted on the secondary computing device in an off state directly (e.g., without additional conversion) from the snapshot because the snapshot reflects the virtual machine in an off state, and the format of the virtual machine is supported by the secondary computing device without additional conversion.

In a fourth example of hosting the virtual machine, it may be determined that the primary virtual machine type is not supported, the snapshot was created while the virtual machine was in a running state on the primary computing device, and the virtual machine is to be hosted on the secondary computing device in an off state. Because the secondary computing device does not support the primary virtual machine type, an additional conversion may be performed to convert the virtual machine to a secondary virtual machine type supported by the secondary computing device. In particular, the snapshot may be used to host the virtual machine in a running state within a virtual machine host software environment configured to support the primary virtual machine type because the snapshot reflects the virtual machine in a running state. It may be appreciated that one or more snapshots of the virtual machine in the primary virtual machine type may be consolidated, after which the virtual machine may be shut down from the running state to an off state. The virtual machine in the off state may be converted from the primary virtual machine type to a secondary virtual machine type supported by the secondary computing device. The virtual machine converted to the secondary virtual machine type may be hosted on the secondary computing device in an off state.

In a fifth example of hosting the virtual machine, it may be determined that the primary virtual machine type is not supported, the snapshot was created while the virtual machine was in an off state on the primary computing device, and the virtual machine is to be hosted on the secondary computing device in an off state. Because the secondary computing device does not support the primary virtual machine type, an additional conversion may be performed to convert the virtual machine to a secondary virtual machine type supported by the secondary computing device. In particular, the virtual machine may be converted in the off state, as reflected by the snapshot, from the primary virtual machine type to the secondary virtual machine type supported by the secondary computing device. The virtual machine converted to the secondary virtual machine type may be hosted on the secondary computing device in an off state.

It may be appreciated that a plurality of snapshots of the virtual machine hosted on the primary computing device may be created over time. In this way, the plurality of snapshots of the virtual machine may be maintained. During hosting of the virtual machine on the secondary computing device (e.g., instantiation of an instance of the virtual machine by virtual machine host software), a snapshot that may be used for hosting may be selected from the plurality of snapshots based upon the snapshot comprising desired backup data for the virtual machine.

Because the virtual machine may be hosted on the secondary computing device during a failure of the virtual machine on the primary computing device, fault tolerance may be provided for the virtual machine and/or applications hosted by the virtual machine. That is, the virtual machine and/or applications hosted by the virtual machine may be made accessible to users, other virtual machines, and/or other computing devices through the virtual machine hosted on the secondary computing device, even though the virtual machine may be inaccessible on the primary computing device. In this way, virtual machine may be operable and/or accessible until the virtual machine can (once again) be hosted (e.g., re-instantiated as a new instance of the virtual machine) on the primary computing device. To host (re-instantiate) the virtual machine on the primary computing device in an up-to-date state, snapshots of the virtual machine hosted on the secondary computing device may be created. In particular, a second snapshot of the virtual machine hosted on the secondary computing device may be created. The second snapshot may be sent to the primary computing device for hosting (re-instantiation) on the primary computing device based in part upon re-initialization of the primary computing device (e.g., notification that the primary computing device is available to host the virtual machine). At 310, the method ends.

Figure 4:
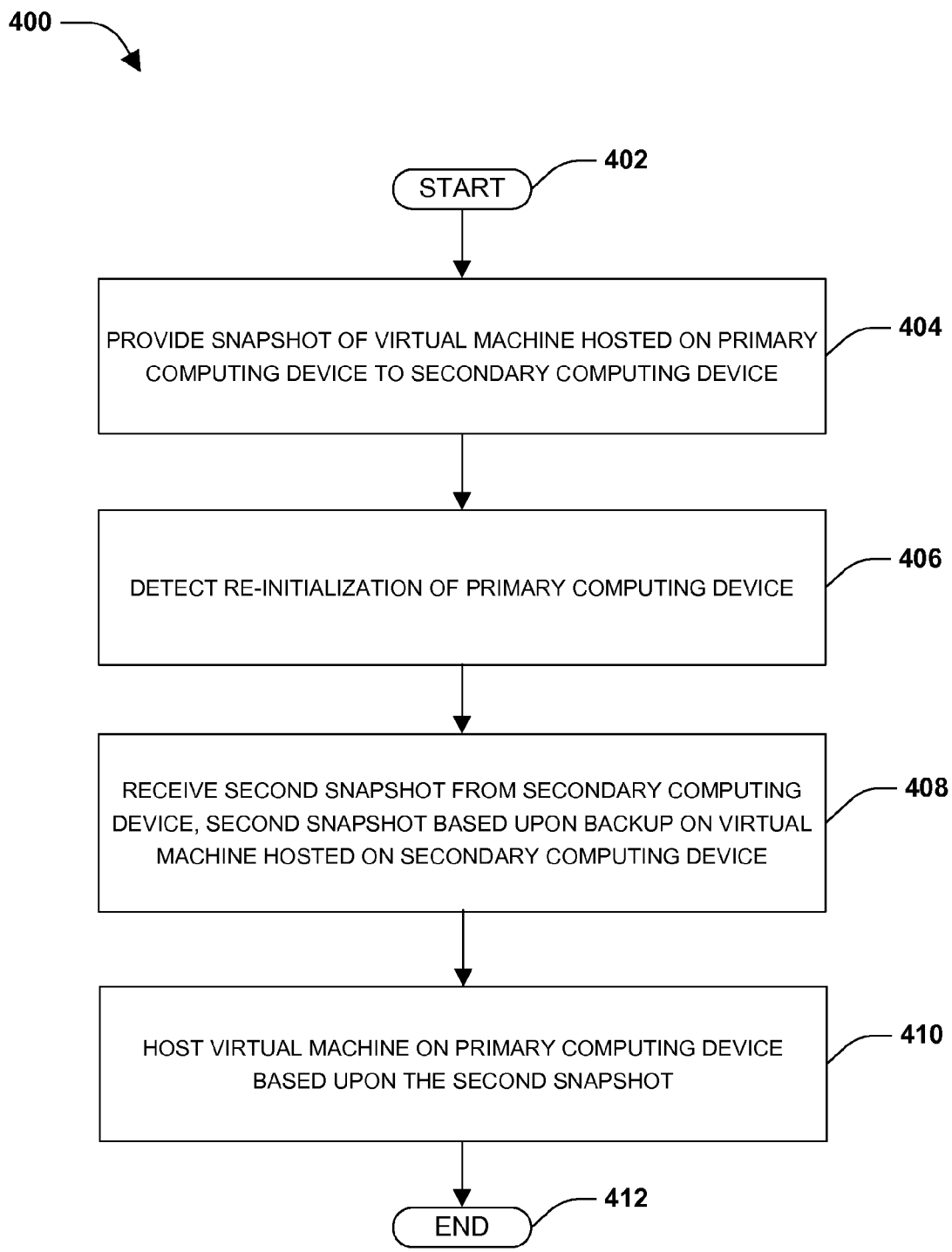
FIG. 4 is a flow chart illustrating an exemplary method of hosting a virtual machine from a snapshot.

One embodiment of hosting a virtual machine from a snapshot is illustrated by an exemplary method 400 in FIG. 4. At 402, the method starts. At 404, a snapshot of a virtual machine hosted on a primary computing device may be provided to a secondary computing device. The snapshot may have been created as part of a backup scheme for the virtual machine on the primary computing device, where the secondary computing device may be designated to host the virtual machine if some failure of the virtual machine on the primary computing device occurs.

In one example, the virtual machine may have failed on the primary computing device. It may be appreciated that the virtual machine may resultantly be hosted on the secondary computing device from the snapshot in response to the failure. At 406, a re-initialization of the primary computing device may occur (e.g., primary computing device is available to re-host the virtual machine). At 408, a second snapshot may be received from the secondary computing device. For example, the second snapshot may have been created as a backup of the virtual machine hosted on the secondary computing device. Upon detecting re-initialization of the primary computing device, the secondary computing device may have sent the second snapshot to the primary computing device for hosting (re-instantiation of a new instance of the virtual machine) on the primary computing device.

At 410, the virtual machine may be hosted (re-hosted or re-instantiated) on the primary computing device based upon the second snapshot. To host the virtual machine, one or more determinations may be made as to whether a secondary virtual machine type of the snapshot (e.g., a format of the virtual machine and/or second snapshot associated with the secondary computing device) is supported by the primary computing device, whether the snapshot was created while the virtual machine was in a running state or an off state, and/or whether the virtual machine is to be hosted in a running state or an off state on the primary computing device.

In a first example of hosting (re-hosting or re-instantiating) the virtual machine on the primary computing device, it may be determined that the secondary virtual machine type is supported, the second snapshot was created while the virtual machine was in a running state on the secondary computing device, and the virtual machine is to be hosted on the primary computing device in a running state. In this way, the virtual machine may be re-hosted on the primary computing device in a running state directly from the second snapshot because the second snapshot reflects the virtual machine in a running state, and the format of the virtual machine is supported by the primary computing device without additional conversion.

In a second example of hosting (re-hosting or re-instantiating) the virtual machine on the primary computing device, it may be determined that the secondary virtual machine type is supported, the second snapshot was created while the virtual machine was in a running state on the secondary computing device, and the virtual machine is to be hosted on the primary computing device in an off state. In this way, the virtual machine may be hosted (re-instantiated) on the primary computing device in an off state directly from the second snapshot. For example, the second snapshot may be directly applied to host the virtual machine on the primary computing device because the format of the virtual machine is supported without additional conversion. The hosted virtual machine (the new instance of the virtual machine instantiated on the primary computing device) may be shut down into an off state because the second snapshot reflects the virtual machine in a running state.

In a third example of hosting (re-hosting or re-instantiating) the virtual machine on the primary computing device, it may be determined that the secondary virtual machine type is supported, the second snapshot was created while the virtual machine was in an off state on the secondary computing device, and the virtual machine is to be hosted on the primary computing device in an off state. In this way, the virtual machine may be re-hosted on the primary computing device in an off state directly from the second snapshot because the second snapshot reflects the virtual machine in an off state, and the format of the virtual machine is supported by the primary computing device without additional conversion.

In a fourth example of hosting (re-hosting or re-instantiating) the virtual machine on the primary computing device, it may be determined that the secondary virtual machine type is not supported, the second snapshot was created while the virtual machine was in a running state on the secondary computing device, and the virtual machine is to be hosted on the primary computing device in an off state. Because the primary computing device does not support the secondary virtual machine type, an additional conversion may be performed to convert the virtual machine to a primary virtual machine type supported by the primary computing device. In particular, the virtual machine may be hosted in a running state within a virtual machine host software environment configured to support the secondary virtual machine type from the second snapshot because the second snapshot reflects the virtual machine in a running state. The virtual machine may be shut down from the running state to an off state. The virtual machine in the off state may be converted from the secondary virtual machine type to a primary virtual machine type supported by the primary computing device. The virtual machine converted to the primary virtual machine type may be hosted (re-instantiated) on the primary computing device in an off state.

In a fifth example of hosting (re-hosting or re-instantiating) the virtual machine on the primary computing device, it may be determined that the secondary virtual machine type is not supported, the second snapshot was created while the virtual machine was in an off state on the secondary computing device, and the virtual machine is to be hosted on the primary computing device in an off state. Because the primary computing device does not support the secondary virtual machine type, an additional conversion may be performed to convert the virtual machine to a primary virtual machine type supported by the primary computing device. In particular, the virtual machine may be converted in the off state, as reflected by the second snapshot, from the secondary virtual machine type to the primary virtual machine type supported by the primary computing device. The virtual machine converted to the primary virtual machine type may be hosted (re-instantiated) on the primary computing device in an off state. At 412, the method ends.

Figure 5:
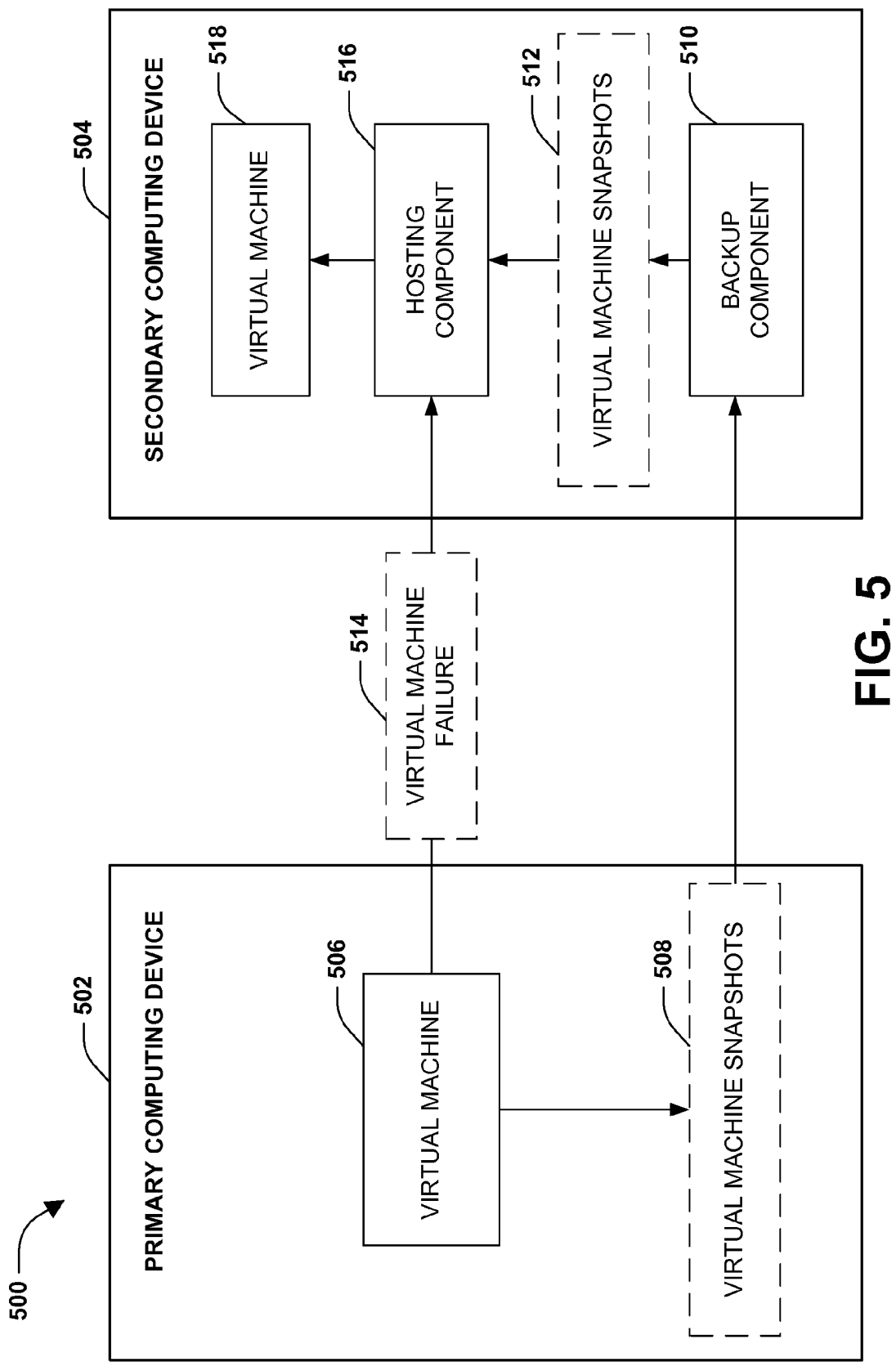
FIG. 5 is a component block diagram illustrating an exemplary system for hosting a virtual machine from a snapshot.

FIG. 5 illustrates an example of a system 500 configured to host or instantiate a virtual machine from a snapshot. It may be appreciated that FIG. 5 may reference an instantiation (instance) of the virtual machine on a primary computing device 502 as virtual machine 506 and may reference an instantiation (instance) of the virtual machine on a secondary computing device 504 as virtual machine 518. System 500 may comprise a backup component 510 and/or a hosting component 516. The backup component 510 may be configured to maintain one or more snapshots 512 of the virtual machine 506 while the virtual machine 506 is hosted on the primary computing device 502. For example, the backup component 510 may maintain the one or more snapshots 512 at the secondary computing device 504. The secondary computing device 504 may be configured to host the virtual machine 518 in the event that a failure occurs relative to the virtual machine 506 hosted on the primary computing device 502. In this way, the virtual machine 518 may be operable and/or accessible on the secondary computing device 502 even though the virtual machine 506 may be inaccessible on the primary computing device 502 due to the failure. Thus, fault tolerance may be provided by the secondary computing device 504 for the virtual machine 518 and/or applications hosted by the virtual machine 518.

In one example, the primary computing device 502 may be configured to host the virtual machine 506. The primary computing device 502 may provide users, other virtual machines, and/or other computing devices with access to interact with and/or manage the virtual machine 506. The primary computing device 502 may host the virtual machine 506 in a running state or an off state. The primary computing device 502 may create snapshots 508 of the virtual machine 506 while hosted on the primary computing device 502. The virtual machine 506 and/or snapshots 508 may be formatted in a primary virtual machine type based upon virtual machine host software that may host the virtual machine 506 and/or create the snapshots 508 (e.g., a particular virtual machine host software may create a snapshot of the virtual machine 506 in an open virtualization format (OVF)). The backup component 510 may receive the snapshots 508 from the primary computing device 502. The backup component 510 may maintain the snapshots 508 as the one or more snapshots 512.

The hosting component 516 may be configured to detect 514 a failure of the virtual machine 506 on the primary computing device 502 (e.g., a failure of the virtual machine 506, a failure of the primary computing device 502, a failure of virtual machine host software hosting the virtual machine 506, etc.). The hosting component 516 may be configured to host the virtual machine 518 on the secondary computing device 504 based upon a snapshot from the one or more snapshots 512 maintained by the backup component 510. The hosting component 516 may be configured to determine whether a primary virtual machine type of the snapshot is supported by the secondary computing device 502. The hosting component may be configured to determine whether the snapshot was created while the virtual machine 506 was in a running state or an off state on the primary computing device 502. The hosting component 516 may be configured to determine whether the virtual machine 518 is to be hosted on the secondary computing device in a running state or an off state.

In a first example, the hosting component 516 may determine that the primary virtual machine type is supported, the snapshot was created while the virtual machine 506 was in a running state on the primary computing device 502, and the virtual machine 518 is to be hosted on the secondary computing device 504 in a running state. The hosting component 516 may host the virtual machine 518 on the secondary computing device 504 in a running state directly from the snapshot because the snapshot reflects the virtual machine 506 in a running state, and the format of the virtual machine 506 is supported by the secondary computing device 504 without additional conversion.

In a second example, the hosting component 516 may determine that the primary virtual machine type is supported, the snapshot was created while the virtual machine 506 was in a running state on the primary computing device 502, and the virtual machine 518 is to be hosted on the secondary computing device 518 in an off state. The hosting component 516 may host the virtual machine 518 on the secondary computing device 504 in an off state directly from the snapshot. For example, the hosting component 516 may directly apply the snapshot to host the virtual machine 518 on the secondary computing device 504 because the format of the virtual machine 506 is supported without additional conversion. The hosting component 516 may shut down the hosted virtual machine 516 into an off state because the snapshot reflects the virtual machine 506 in a running state. That is, because the snapshot reflects the virtual machine in a running state, but the virtual machine is to be hosted on the secondary computing device 504 in an off state, the virtual machine may have to be deactivated upon hosting of the secondary computing device so that it is not executing.

In a third example, the hosting component 516 may determine that the primary virtual machine type is supported, the snapshot was created while the virtual machine 506 was in an off state on the primary computing device 502, and the virtual machine 518 is to be hosted on the secondary computing device 504 in an off state. The hosting component 516 may host the virtual machine 518 on the secondary computing device 504 directly from the snapshot because the snapshot reflects the virtual machine 506 in an off state, and the format of the virtual machine 506 is supported by the secondary computing device 504 without additional conversion.

In a fourth example, the hosting component 516 may determine that the primary virtual machine type is not supported, the snapshot was created while the virtual machine 506 was in a running state on the primary computing device 502, and the virtual machine 518 is to be hosted on the secondary computing device 504 in an off state. Because the secondary computing device 504 does not support the primary virtual machine type, an additional conversion may be performed to convert the virtual machine 506 to a secondary virtual machine type supported by the secondary computing device 504. In particular, the hosting component 516 may use the snapshot to host the virtual machine in a running state within a virtual machine host environment configured to support the primary virtual machine type because the snapshot reflects the virtual machine 506 in a running state. The hosting component 516 may shut down the virtual machine from the running state to an off state. The hosting component 516 may convert the virtual machine in the off state from the primary virtual machine type to a secondary virtual machine type supported by the secondary computing device 504. The hosting component 516 may host the virtual machine 518 converted to the secondary virtual machine type on the secondary computing device 504 in an off state.

In a fifth example, the hosting component 516 may determine that the primary virtual machine type is not supported, the snapshot was created while the virtual machine 506 was in an off state on the primary computing device 502, and the virtual machine 518 is to be hosted on the secondary computing device 504 in an off state. Because the secondary computing device 504 does not support the primary virtual machine type, an additional conversion may be performed to convert the virtual machine 506 to a secondary virtual machine type supported by the secondary computing device 504. In particular, the hosting component 516 may convert the virtual machine in the off state from the primary virtual machine type to a secondary virtual machine type supported by the secondary computing device 504. The hosting component 516 may host the virtual machine 518 converted to the secondary virtual machine type on the secondary computing device 504 in an off state.

Figure 6:
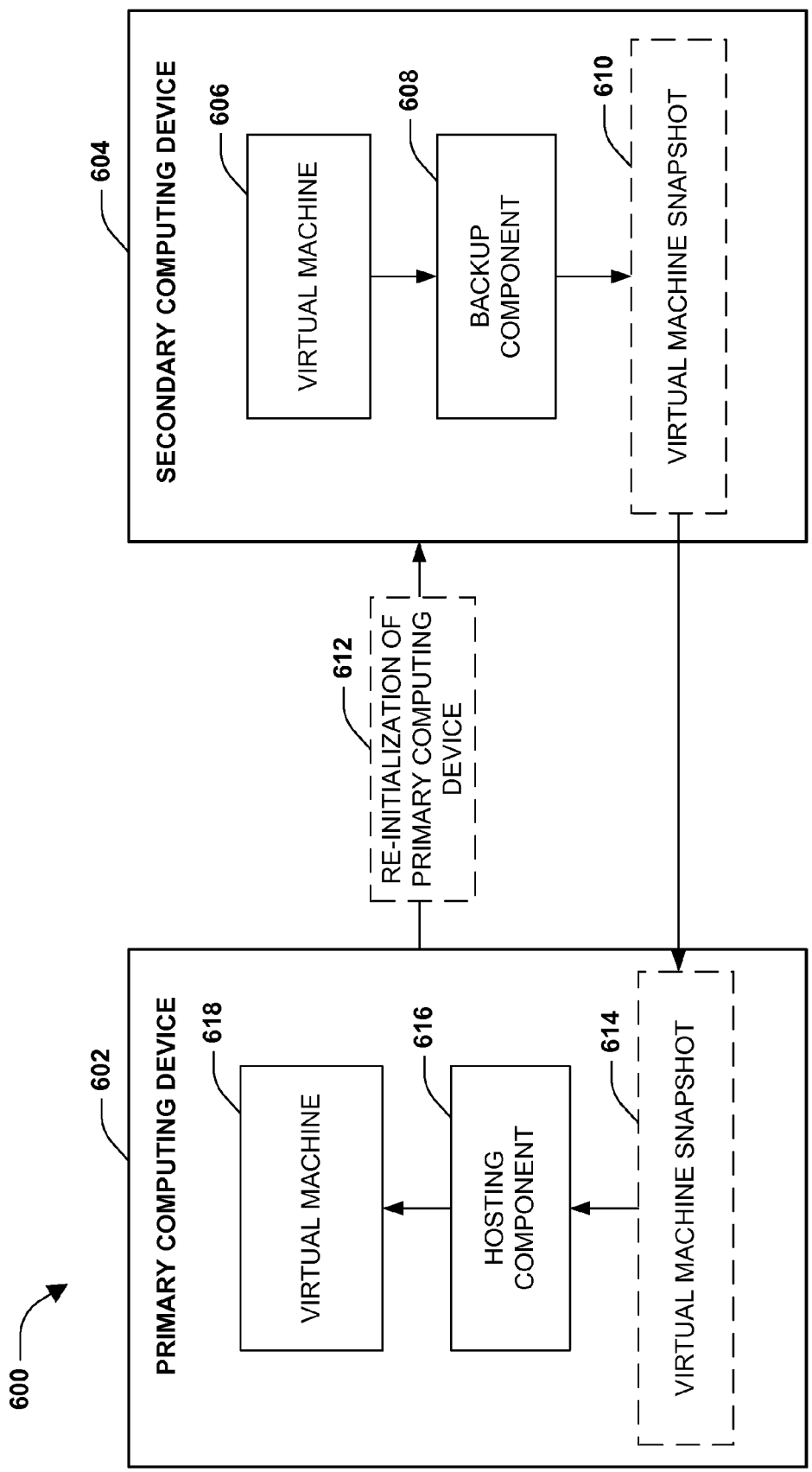
FIG. 6 is an example of a secondary computing device providing a snapshot of a virtual machine to a primary computing device for hosting of the virtual machine on the primary computing device.

FIG. 6 illustrates an example 600 of a secondary computing device 604 providing a snapshot 614 of a virtual machine to a primary computing device 602 for hosting (re-hosting or re-instantiating) the virtual machine on the primary computing device 602 (instantiation of a new instance of the virtual machine). It may be appreciated that FIG. 6 may reference an instantiation (instance) of the virtual machine on the secondary computing device 604 as virtual machine 606 and may reference a re-instantiation (instance) of the virtual machine on the primary computing device 602 as virtual machine 618. The primary computing device 602 may be configured to host the virtual machine. The primary computing device 602 may have created snapshots of the virtual machine while the virtual machine was hosted on the primary computing device 602. The snapshots may have been provided to the secondary computing device 604. The secondary computing device 604 may be configured to host an instantiation the virtual machine 606 on the secondary computing device 604 in the event that a failure occurs of the virtual machine on the primary computing device 602. In this way, the virtual machine 606 may be operable and/or accessible until the virtual machine can be hosted (re-instantiated) as virtual machine 618 on the primary computing device 602.

In one example, the virtual machine 606 may be hosted on the secondary computing device 604 from a snapshot of the virtual machine created while the virtual machine was hosted on the primary computing device 602. The virtual machine 606 may have been hosted because the virtual machine on the primary computing device 602 may have failed. A backup component 608 may be configured to create one or more snapshots 610 of the virtual machine 606 hosted on the secondary computing device 604. Upon detecting re-initialization of the primary computing device 602 (e.g., notification that the primary computing device 612 has the ability to re-host the virtual machine), the secondary computing device 604 may provide the snapshot 614 of the virtual machine hosted on the secondary computing device 604 to the primary computing device 602 for re-instantiation. A hosting component 616 may host (re-instantiate) the virtual machine 618 on the primary computing device 602 from the snapshot 614. In this way, after recovering from a failure, the primary computing device 602 may once again host (re-instantiate) the virtual machine 618 using the snapshot 614 of the virtual machine 606 created while the virtual machine 606 was hosted on the secondary computing device 604. Thus, modifications to the virtual machine 606 while hosted on the secondary computing device 604 may remain intact in the (re-instantiated) virtual machine 618.

Figure 7:
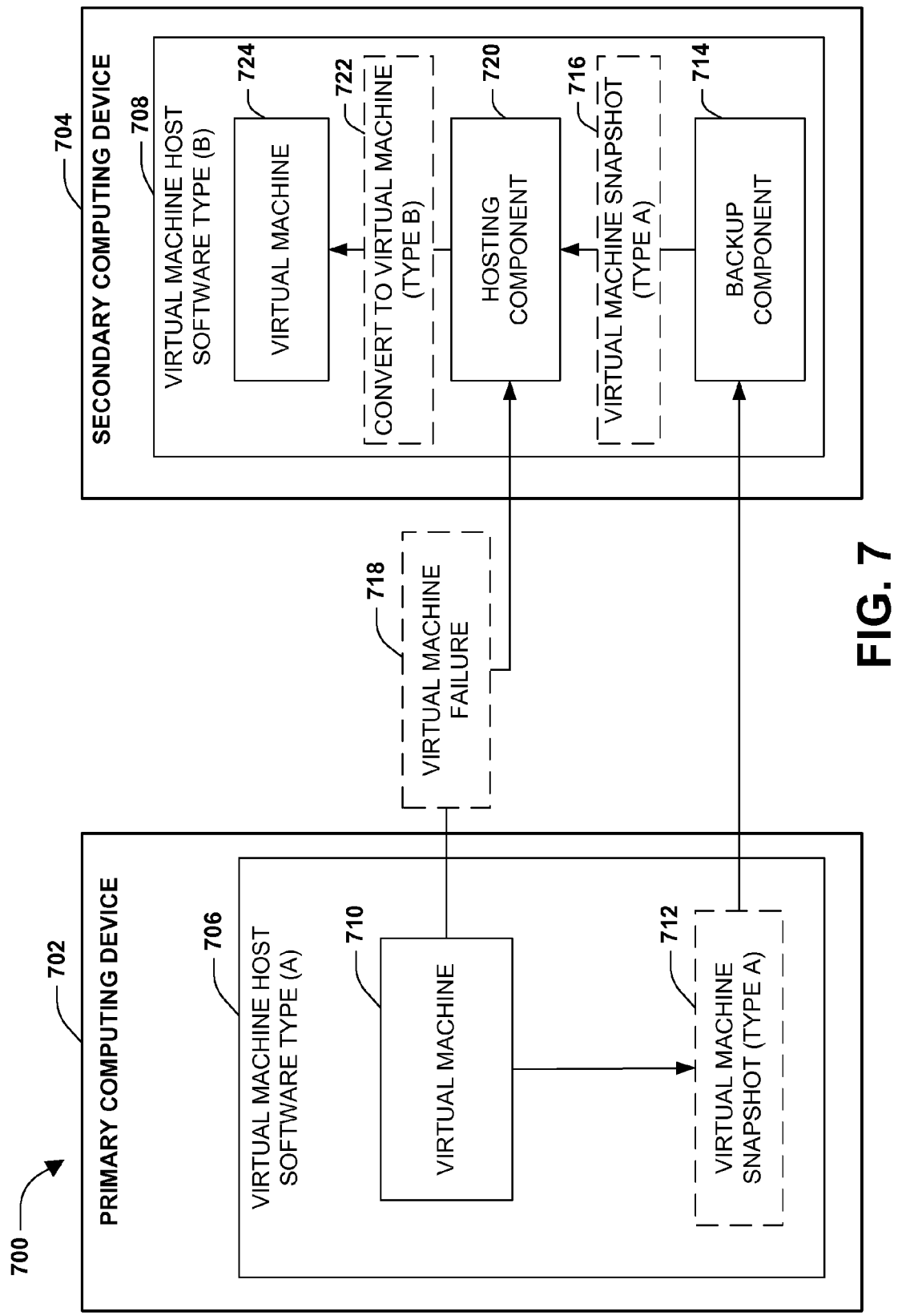
FIG. 7 is an example of hosting a virtual machine converted to a secondary virtual machine type supported by a secondary computing device.

FIG. 7 illustrates an example 700 of hosting a virtual machine converted to a secondary virtual machine type supported by a secondary computing device 704. It may be appreciated that FIG. 7 may reference an instantiation (instance) of the virtual machine on a primary computing device 702 as virtual machine 710 and may reference an instantiation (instance) of the virtual machine on a secondary computing device 704 as virtual machine 724. The primary computing device 702 may comprise virtual machine host software type (A) 706. The virtual machine host software type (A) 706 may be configured to host virtual machines and/or create snapshots of virtual machines in a type (A) format. For example, the virtual machine host software type (A) 706 may host the virtual machine 710 in a type (A) format. The virtual machine 710 may be hosted in a running state or an off state on the primary computing device 702. The virtual machine host software type (A) 706 may create a virtual machine snapshot 712 in a type (A) format of the virtual machine 710.

The secondary computing device 704 may comprise a virtual machine host software type (B) 708. The virtual machine host software type (B) 708 may be configured to host virtual machines and/or create snapshots of virtual machines in a type (B) format. The secondary computing device 704 may comprise a backup component 714 configured to maintain snapshots received from the primary computing device 702. For example, the backup component 714 may receive the virtual machine snapshot 712 in the type (A) format from the primary computing device 702. The backup component 714 may maintain the virtual machine snapshot 712 as a virtual machine snapshot 716 for backup and/or recovery purposes in the event that a failure occurs of the virtual machine 710 on the primary computing device 702.

The secondary computing device 704 may comprise a hosting component 720. The hosting component 720 may detect 718 a failure of the virtual machine 710 on the primary computing device 702. To facilitate the continued operation of the virtual machine during failure of the virtual machine 710, the hosting component 720 may host the virtual machine 724 on the secondary computing device 704. In particular, the hosting component 720 may determine that the virtual machine snapshot 716 in the type (A) format is not supported by the virtual machine host software type (B) 708 of the secondary computing device 704. Thus, the hosting component 720 may either determine that the virtual machine within the virtual machine snapshot 716 is in a shutdown state or shut down the virtual machine within the virtual machine snapshot 716 to a shutdown state. The hosting component 720 may covert 722 the virtual machine in the shutdown state from the type (A) format to the type (B) format. The hosting component 720 may host the virtual machine 724 converted to the type (B) format within the virtual machine host software type (B) 708. In this way, the virtual machine 724 may be operable and/or accessible from the secondary computing device 704 even though the virtual machine 710 may be inaccessible on the primary computing device 702 due to the failure.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 8:
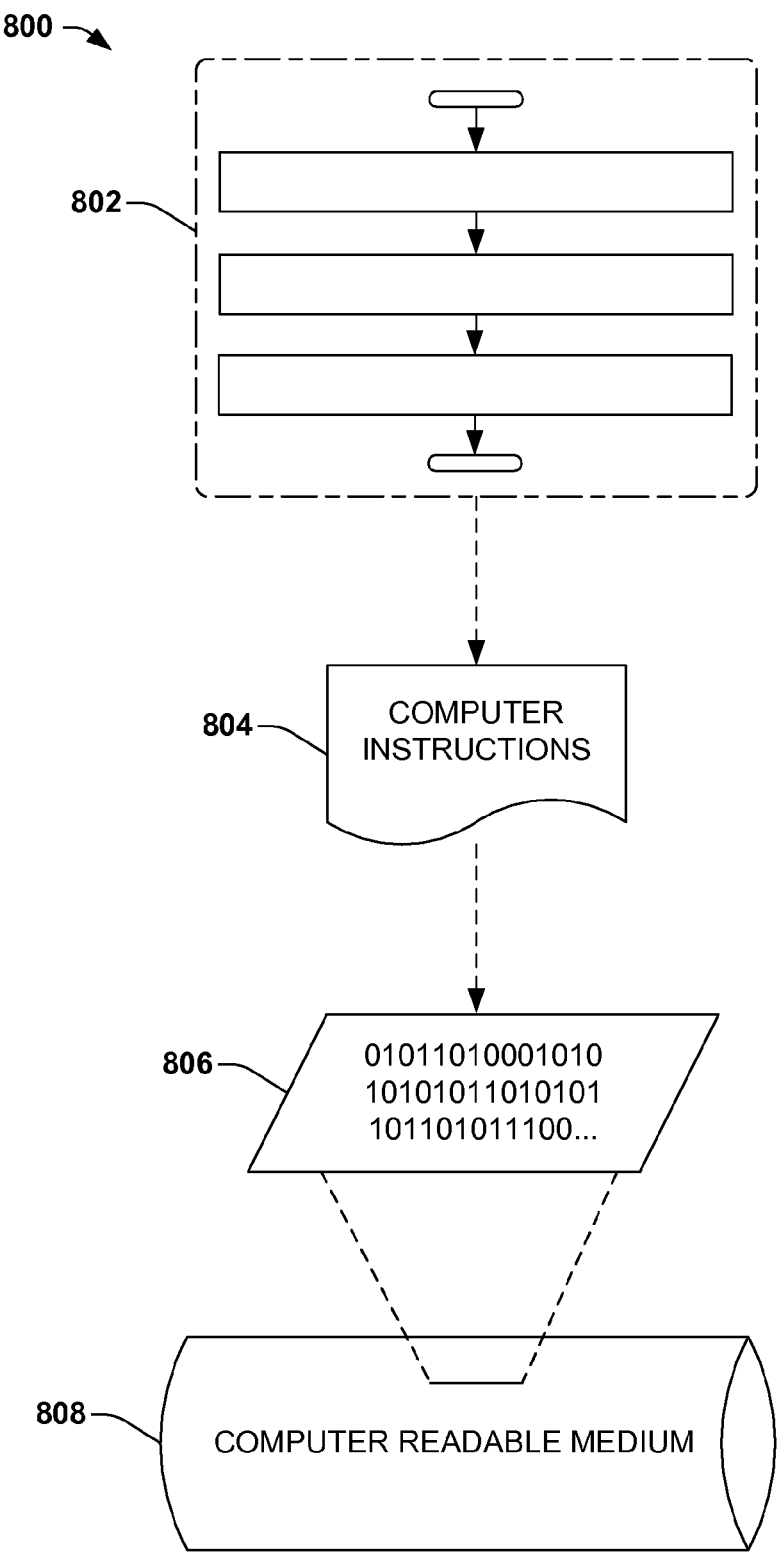
FIG. 8 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 8, where the implementation 800 comprises a computer-readable medium 808 (e.g., a CD-R, DVD-R, platter of a hard disk drive, flash drive, etc.), on which is encoded computer-readable data 806. This computer-readable data 806 in turn comprises a set of computer instructions 804 configured to operate according to the principles set forth herein. In one such embodiment, the processor-executable instructions 804 may be configured to perform a method 802, such as at least some of the method 300 of FIG. 3 and/or method 400 of FIG. 4, for example, as well as at least some of a system, such as at least some of the system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form. Further, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing virtual machine fault tolerance from a snapshot, comprising:
    receiving a first snapshot of a virtual machine, the first snapshot created while the virtual machine is hosted on a primary computing device, the first snapshot comprising a first backup image of the virtual machine at a first point in time;
    receiving a second snapshot of the virtual machine, the second snapshot created while the virtual machine is hosted on the primary computing device, the second snapshot comprising a second backup image of the virtual machine at a second point in time;
    detecting a failure of the virtual machine hosted on the primary computing device;
    aggregating the first snapshot and the second snapshot to create a non-conflicting snapshot of the virtual machine, the aggregating comprising propagating non-conflicting features of the first snapshot and the second snapshot into the non-conflicting snapshot; and
    hosting the virtual machine on a secondary computing device based upon the non-conflicting snapshot.

2. The method of claim 1, the non-conflicting snapshot comprising an aggregate snapshot of the first snapshot and the second snapshot, and the hosting the virtual machine comprising hosting the virtual machine as an aggregate of the first snapshot and the second snapshot based upon the aggregate snapshot.

3. The method of claim 1, the aggregating comprising:
    consolidating first virtual machine data within the first snapshot and second virtual machine data within the second snapshot to create the non-conflicting snapshot.

4. The method of claim 1, the hosting comprising:
    creating a new snapshot of the virtual machine hosted on the secondary computing device.

5. The method of claim 4, comprising:
    responsive to determining that the primary computing device is available to re-host the virtual machine, re-hosting the virtual machine on the primary computing device based upon the new snapshot from the secondary computing device.

6. The method of claim 5, the re-hosting comprising:
    responsive to determining that a secondary virtual machine type of the new snapshot is not supported by the primary computing device, converting the new snapshot from the secondary virtual machine type to a primary virtual machine type supported by the primary computing device.

7. The method of claim 1, the first snapshot and the second snapshot created based upon a backup scheme for the virtual machine.

8. The method of claim 1, the hosting comprising:
    responsive to determining that a primary virtual machine type of the non-conflicting snapshot is not supported by the secondary computing device, converting the non-conflicting snapshot from the primary virtual machine type to a secondary virtual machine type supported by the secondary computing device.

9. The method of claim 8, the converting comprising:
responsive to determining that the non-conflicting snapshot corresponds to a snapshot of the virtual machine while in an on state:
hosting the virtual machine, in the on state, within a virtual machine host software environment using the non-conflicting snapshot, the virtual machine host software environment configured to support the primary virtual machine type;
shutting down the on state of the virtual machine to an off state;
converting the virtual machine in the off state from the primary virtual machine type to the secondary virtual machine type; and
hosting the virtual machine, converted to the secondary virtual machine type, on the secondary computing device.

10. The method of claim 9, the virtual machine host software environment hosted by the secondary computing device.

11. The method of claim 9, the virtual machine host software environment hosted by a computing device different than the secondary computing device.

12. The method of claim 8, the converting comprising:
responsive to determining that the non-conflicting snapshot corresponds to a snapshot of the virtual machine while in an off state:
converting the virtual machine in the off state from the primary virtual machine type to the secondary virtual machine type; and
hosting the virtual machine, converted to the secondary virtual machine type, on the secondary computing device.

13. The method of claim 1, the hosting comprising:
responsive to determining that an application accesses data hosted by the virtual machine, providing the application with access to the virtual machine hosted on the secondary computing device.

14. A system for providing virtual machine fault tolerance from a snapshot, comprising:
one or more processors; and
memory comprising instructions that when executed by at least one of the one or more processors implement a hosting component configured to:
receive a first snapshot of a virtual machine, the first snapshot created while the virtual machine is hosted on a primary computing device, the first snapshot comprising a first backup image of the virtual machine at a first point in time;
receive a second snapshot of the virtual machine, the second snapshot created while the virtual machine is hosted on the primary computing device, the second snapshot comprising a second backup image of the virtual machine at a second point in time;
detect a failure of the virtual machine hosted on the primary computing device;
aggregate the first snapshot and the second snapshot to create a non-conflicting snapshot of the virtual machine, comprising propagating non-conflicting features of the first snapshot and the second snapshot into the non-conflicting snapshot; and
host the virtual machine on a secondary computing device based upon the non-conflicting snapshot.

15. The system of claim 14, the hosting component configured to:
consolidate first virtual machine data within the first snapshot and second virtual machine data within the second snapshot to create the non-conflicting snapshot.

16. The system of claim 14, the hosting component configured to:
responsive to determining that a primary virtual machine type of the non-conflicting snapshot is not supported by the secondary computing device, convert the non-conflicting snapshot from the primary virtual machine type to a secondary virtual machine type supported by the secondary computing device.

17. The system of claim 14, the hosting component configured to:
create a new snapshot of the virtual machine hosted on the secondary computing device.

18. The system of claim 17, the hosting component configured to:
responsive to determining that the primary computing device is available to re-host the virtual machine, re-host the virtual machine on the primary computing device based upon the new snapshot from the secondary computing device.

19. The system of claim 14, the hosting component configured to:
responsive to determining that an application accesses data hosted by the virtual machine, provide the application with access to the virtual machine hosted on the secondary computing device.

20. A computer readable medium comprising instructions which when executed at least in part via a processing unit perform a method for providing virtual machine fault tolerance from a snapshot, comprising:
receiving a first snapshot of a virtual machine, the first snapshot created while the virtual machine is hosted on a primary computing device;
receiving a second snapshot of the virtual machine, the second snapshot created while the virtual machine is hosted on the primary computing device;
detecting a failure of the virtual machine hosted on the primary computing device;
aggregating the first snapshot and the second snapshot to create a non-conflicting snapshot of the virtual machine, the aggregating comprising propagating non-conflicting features of the first snapshot and the second snapshot into the non-conflicting snapshot; and
hosting the virtual machine on a secondary computing device based upon the non-conflicting snapshot.

* * * * *